UNITED STATES PATENT OFFICE.

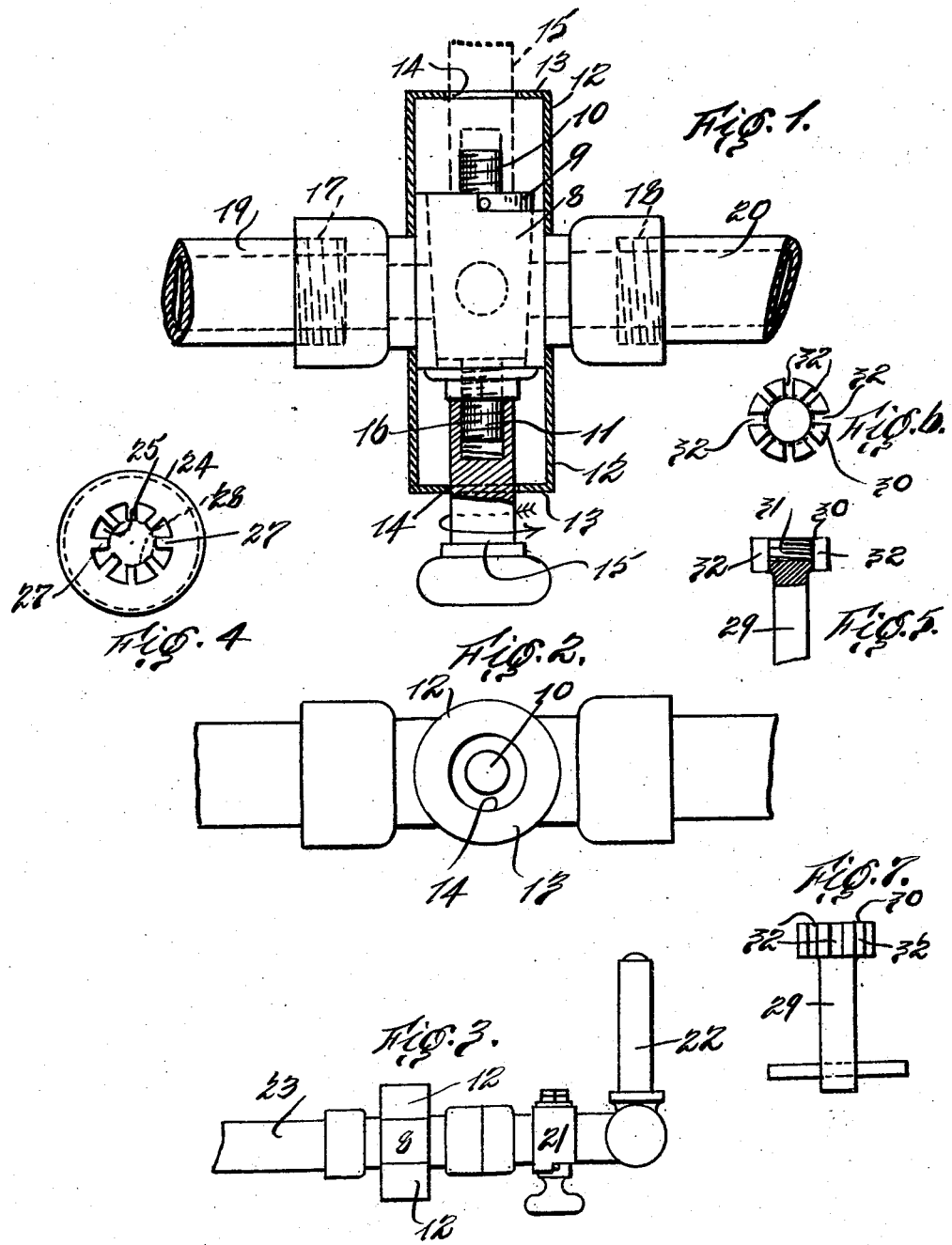

HARRY MARGULIES, OF NEW YORK, N. Y.

GAS COCK.

1,420,434.  Specification of Letters Patent.  Patented June 20, 1922.

Application filed February 17, 1921. Serial No. 445,726.

*To all whom it may concern:*

Be it known that I, HARRY MARGULIES, a citizen of Poland, residing at New York city, county and State of New York, have invented certain new and useful Improvements in Gas Cocks, of which the following is a full, clear, and exact description.

This invention relates to improvements in gas cocks, one of the objects being to provide a cock or valve arranged so that a duct for a gas or even a liquid can be closed to prevent the flow of gas or liquid. The chief object of my invention is to provide a shut-off cock or valve arranged to require a special key to operate same; hence, the line can be closed and opened only by means of a special key which will be kept by an authorized person. My invention is especially valuable in connection with gas lines, as the line can be closed at will, thereby eliminating the danger of manipulation by children, for instance, or persons not familiar with the use of gas.

I will now proceed to describe my invention in detail, the novel features of which I will finally claim, reference being had to the accompanying drawing, wherein:—

Fig. 1 is an enlarged detail view of my improved shut-off cock, a portion thereof being in section;

Fig. 2 is a plan view thereof;

Fig. 3 is a diagrammatic view, illustrating the shut-off cock in combination with a service valve; and Figs. 4, 5, 6 and 7 are detail views of a modified form of key mechanism.

Referring to Fig. 1, my improved shut-off cock is made up of a valve chamber 8 containing a rotatable valve 9, in this instance a tapered valve, having a threaded stud 10 at one end and a similar stud 11 at the opposite end. Each stud 10 and 11 is covered or protected by a sleeve 12, each sleeve being soldered or otherwise secured to the valve casing 8. Each sleeve is partly closed at its outer end 13, there being an opening 14 provided for the insertion of a key 15 having a threaded bore 16 to engage either stud 10 or 11. The valve casing 8 will be arranged to engage at each end, as at 17 and 18, the adjacent ends of pipes 19 and 20.

Fig. 3 illustrates the shut off valve as combined with a service valve 21 for a gas nipple 22, a portion of a gas duct being indicated by 23. To open or close the shut off valve or cock 9, the key 15 will be passed through opening 14 adjacent stud 10 or 11, as the case may be, and screwed onto same. After the key has been screwed home, the valve may be turned to open or close same, whereupon the key can be screwed off the stud engaged thereby. It will be readily seen that the valve 9 cannot be turned excepting by a key threaded in accordance with the threads of studs 10 and 11. Furthermore, the sleeves 12 prevent the valve from being turned by pliers, as the studs 10 and 11 cannot be engaged. Instead of employing a sleeve having an uninterrupted circular opening, I may employ a sleeve 24 provided with an opening 25 having projections 27 extending inwardly from the wall thereof to a point approximately in line with the stud (indicated by dotted lines 28 in Fig. 4) on the valve, in order that pliers having long thin prongs cannot be inserted and manipulated to turn the valve. In connection with this form of sleeve, I employ a key 29 having a head 30 provided with a threaded bore 31 to engage the studs on the valve. The thickness of the head 30 will be slightly less than the distance between the end of the studs and adjacent end of the sleeve covering each stud. The head 30 will be provided with channels 32 for the passage of the projections 27. To insert the key, the channels 32 will be caused to line up with projections 27 and pressed inwardly to engage the adjacent stud, as the key can be rotated after head 30 has been pressed into the sleeve sufficiently to clear the projections 27. The projections prevent the valve from being engaged by any other than the proper key.

Having described my invention, what I claim and desire to secure by Letters Patent is:—

In a shut off valve mechanism, the combination of a casing, a rotatable valve within the same, a sleeve covering each end of the valve having an opening in the end wall thereof, projections extending inwardly from the wall of the opening, a threaded stud at each end of the valve, a key insertable through the opening in each sleeve, and a head carried by the key having channels for the passage of the projections on the sleeves, the thickness of said head being less than the distance between the ends of the studs and the adjacent end wall of the sleeves covering same, whereby said key can be rotated to operate the valve after said head has been moved inwardly to clear said projections, said head having a threaded bore to engage the threaded studs on said valve.

Signed at New York city, N. Y., this 16 day of February, 1921.

HARRY MARGULIES.

Witnesses:
 MAURICE BLOCK,
 EDWARD A. JARVIS.